United States Patent
Liu et al.

(10) Patent No.: US 10,277,371 B2
(45) Date of Patent: Apr. 30, 2019

(54) SYSTEM AND METHOD FOR HANDLING ORPHAN RESOURCE ELEMENTS

(71) Applicant: Future Wei Technologies, Inc., Plano, TX (US)

(72) Inventors: Bin Liu, San Diego, CA (US); Ruiqi Zhang, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/705,779

(22) Filed: Sep. 15, 2017

(65) Prior Publication Data

US 2018/0227093 A1    Aug. 9, 2018

Related U.S. Application Data

(60) Provisional application No. 62/455,239, filed on Feb. 6, 2017.

(51) Int. Cl.
| | |
|---|---|
| *H04B 7/06* | (2006.01) |
| *H04L 5/00* | (2006.01) |
| *H04J 11/00* | (2006.01) |
| *H04B 7/0456* | (2017.01) |

(52) U.S. Cl.
CPC ........... *H04L 5/0044* (2013.01); *H04B 7/068* (2013.01); *H04B 7/0669* (2013.01); *H04B 7/0478* (2013.01); *H04B 7/06* (2013.01); *H04J 11/00* (2013.01); *H04J 2211/005* (2013.01)

(58) Field of Classification Search
CPC ... H04L 5/0023; H04L 1/0606; H04L 1/0668; H04L 1/1861; H04L 5/0035; H04L 5/0044; H04L 5/00; H04B 7/068; H04B 7/06; H04J 11/00; H04J 2211/005; H04W 72/0453

See application file for complete search history.

(56) References Cited

U.S. PATENT DOCUMENTS

| | | | |
|---|---|---|---|
| 2010/0041350 A1* | 2/2010 | Zhang | H04B 7/068 455/101 |
| 2012/0163236 A1* | 6/2012 | Kim | H04L 25/03898 370/254 |
| 2018/0007668 A1* | 1/2018 | Yum | H04L 1/0067 |

FOREIGN PATENT DOCUMENTS

| | | |
|---|---|---|
| EP | 2479918 A1 | 7/2012 |
| WO | 2013073909 A1 | 5/2013 |
| WO | 2013134272 A1 | 9/2013 |

OTHER PUBLICATIONS

Qualcomm Inc., "SFBC PDSCH transmission in CSI-RS subframes," 3GPP TSG-RAN WG1 #62, R1-104798, Agenda item 6.3.2.3, Aug. 23-27, 2010, 6 pages.

Nokia, et al., "DMRS-based Semi-open Loop Schemes for Rank 1 transmission," 3GPP TSG RAN WG1 Meeting 86bis, Agenda item 7.2.4.3, R1-1608927, Lisbon, Portugal, 6 pages.

(Continued)

*Primary Examiner* — Rahel Guarino (74) *Attorney, Agent, or Firm* — Slater Matsil, LLP (57) ABSTRACT

A method for transmitting data includes grouping resource elements (REs) of orthogonal frequency division multiplexed (OFDM) symbols of a physical resource block (PRB) into at least one paired RE and at least one orphan RE, transmitting the at least one paired RE in accordance with space frequency block coding (SFBC), and transmitting the at least one orphan RE in accordance with a precoder.

25 Claims, 4 Drawing Sheets

(56) References Cited

OTHER PUBLICATIONS

Catt, et al., "WF on orphan RE for semi-open-loop," 3GPP TSG RAN1 Meeting #87, Agenda item 6.2.2.2, R1-1613277, Reno, NV, Nov. 14-18, 2016, 4 pages.
"3rd Generation Partnership Project; Technical Specification Group Radio Access Network; Evolved Universal Terrestrial Radio Access (E-UTRA); Physical channels and modulation (Release 14)," 3GPP TS 36.211, V14.2.0, Mar. 2017, 194 pages.
"3rd Generation Partnership Project; Technical Specification Group Radio Access Network; Evolved Universal Terrestrial Radio Access (E-UTRA); Multiplexing and channel coding (Release 14)," 3GPP TS 36.212, V 14.2.0, Mar. 2017, 34 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.3.0, Jun. 2017, 460 pages.

* cited by examiner

SYSTEM AND METHOD FOR HANDLING ORPHAN RESOURCE ELEMENTS

This application claims the benefit of U.S. Provisional Application No. 62/455,239, filed on Feb. 6, 2017, entitled "System and Method for Handling Orphan Resource Elements," which application is hereby incorporated herein by reference.

TECHNICAL FIELD

The present disclosure relates generally to a system and method for digital communications, and, in particular embodiments, to a system and method for handling orphan resource elements (REs).

BACKGROUND

Developers of modern communications systems are under constant pressure to increase data throughput and coverage range to meet the ever growing demand from consumers. Advanced block coding techniques, such as space time block coding (STBC) and space frequency block coding (SFBC), have been deployed to improve data throughput in modern communications systems.

However, implementing these advanced block coding techniques using legacy structures and formats have led to inconsistencies and conflicts that may degrade overall performance or require special handling, which complicates implementation.

SUMMARY

Example embodiments provide a system and method for handling orphan resource elements (REs).

In accordance with an example embodiment, a method for transmitting data is provided. The method includes grouping, by a transmitting device, resource elements (REs) of orthogonal frequency division multiplexed (OFDM) symbols of a physical resource block (PRB) into at least one paired RE and at least one orphan RE, transmitting, by the transmitting device, the at least one paired RE in accordance with space frequency block coding (SFBC), and transmitting, by the transmitting device, the at least one orphan RE in accordance with a precoder.

Optionally, in any of the preceding embodiments, wherein transmitting the at least one orphan RE includes applying, by the transmitting device, the precoder to the at least one orphan RE to produce transmission symbols, and transmitting, by the transmitting device, the transmission symbols.

Optionally, in any of the preceding embodiments, wherein the transmitting device is operating in a semi-open-loop transmission mode.

Optionally, in any of the preceding embodiments, wherein the method further comprises selecting, by the transmitting device, the precoder.

Optionally, in any of the preceding embodiments, wherein the method further comprises sending, by the transmitting device, an indication of the precoder to a receiving device.

Optionally, in any of the preceding embodiments, wherein the indication is sent in a radio resource control (RRC) message.

Optionally, in any of the preceding embodiments, wherein the indication is a co-phasing parameter of a Third Generation Partnership Project (3GPP) Long Term Evolution (LTE) codebook W2 channel state information (CSI) report.

Optionally, in any of the preceding embodiments, wherein the precoder is selected from a group of precoders in accordance with a specified rule.

Optionally, in any of the preceding embodiments, wherein the group of precoders is predefined or signaled by the transmitting device.

Optionally, in any of the preceding embodiments, wherein the specified rule is specified by one of a technical standard or an operator of a communications system including the transmitting device.

In accordance with an example embodiment, a method for receiving data is provided. The method includes determining, by a receiving device, a precoder used in a transmission of at least one orphan RE, decoding, by the receiving device, at least one paired RE in accordance with SFBC, and decoding, by the receiving device, the at least one orphan RE in accordance with the precoder.

Optionally, in any of the preceding embodiments, wherein determining the precoder includes receiving an indication of the precoder.

Optionally, in any of the preceding embodiments, wherein the indication is received in a RRC message.

Optionally, in any of the preceding embodiments, wherein determining the precoder includes receiving, by the receiving device, indication of a group of precoders, and selecting, by the receiving device, the precoder from the group of precoders in accordance with a specified rule.

Optionally, in any of the preceding embodiments, wherein the specified rule is received in a message.

Optionally, in any of the preceding embodiments, wherein the specified rule is specified by one of a technical standard or an operator of a communications system including the receiving device.

In accordance with an example embodiment, a transmitting device is provided. The transmitting device includes a processor, and a computer readable storage medium storing programming for execution by the processor. The programming including instructions to configure the transmitting device to group REs of OFDM symbols of a physical resource block (PRB) into at least one paired RE and at least one orphan RE, transmit the at least one paired RE in accordance with SFBC, and transmit the at least one orphan RE in accordance with a precoder.

Optionally, in any of the preceding embodiments, wherein the programming includes instructions to configure the transmitting device to apply the precoder to the at least one orphan RE to produce transmission symbols, and transmit the transmission symbols.

Optionally, in any of the preceding embodiments, wherein the programming includes instructions to configure the transmitting device to select the precoder.

Optionally, in any of the preceding embodiments, wherein the programming includes instructions to configure the transmitting device to send an indication of the precoder to a receiving device.

In accordance with an example embodiment, a receiving device is provided. The receiving device includes a processor, and a computer readable storage medium storing programming for execution by the processor. The programming including instructions to configure the receiving device to determine a precoder used in a transmission of at least one orphan RE, decode at least one paired RE in accordance with SFBC, and decode the at least one orphan RE in accordance with the precoder.

Optionally, in any of the preceding embodiments, wherein the programming includes instructions to configure the receiving device to receiving an indication of the precoder.

Optionally, in any of the preceding embodiments, wherein the programming includes instructions to configure the receiving device to select the precoder from a group of precoders in accordance with a specified rule.

Practice of the foregoing embodiments enables the transmission of orphan REs that will not complicate the processing of the REs at a receiving device nor break a processing pipeline at the receiving device.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
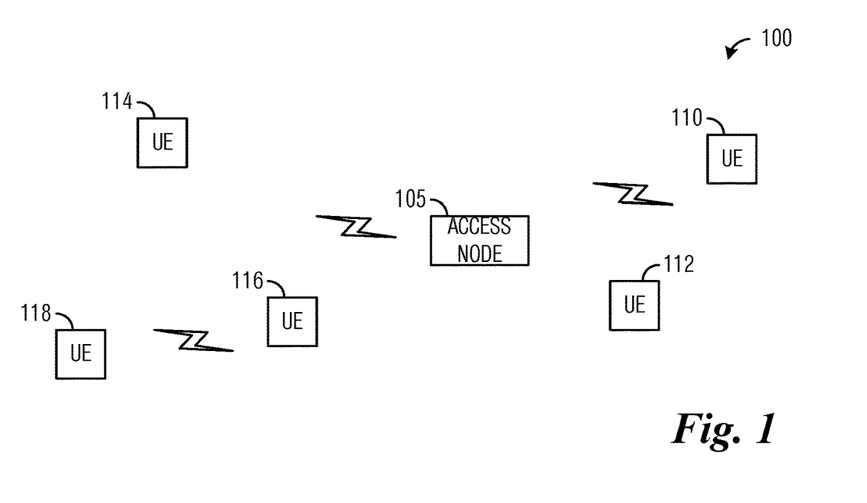
FIG. 1 illustrates an example wireless communications system according to example embodiments described herein.

FIG. 1 illustrates an example wireless communications system 100. Wireless communications system 100 includes an access node 105 serving a plurality of user equipments (UEs), including UEs 110, 112, 114, and 116. In a first operating mode, communications for the UEs or from the UEs pass through access node 105. In a second operating mode, some UEs can directly communicate with one another without having to go through access node 105. As shown in FIG. 1, UEs 116 and 118 may be in direct communications with each other. However, even in the second operating mode, the network resources used by the UEs in direct communications may still be allocated by access node 105.

While it is understood that communications systems may employ multiple access nodes capable of communicating with a number of UEs, only one access node, and five UEs are illustrated for simplicity.

Access nodes may also be commonly referred to as evolved NodeBs (eNBs), next generation (NG) NodeBs (gNBs), base stations, NodeBs, master eNBs (MeNBs), secondary eNBs (SeNBs), master gNBs (MgNBs), secondary gNBs (SgNBs), remote radio heads, access points, and the like, while UEs may also be commonly referred to as mobiles, mobile stations, terminals, subscribers, users, stations, and the like. A transmission point (TP) may be used to refer to any device capable of transmitting. Therefore, transmission points may refer to access nodes, eNBs, base stations, NodeBs, MeNBs, SeNBs, remote radio heads, access points, and the like. In some situations, UEs, mobiles, mobile stations, terminals, subscribers, users, and the like, may also operate as a TP. A transmit-receive point (TRP) refers to a TP that also is capable of receiving.

Space frequency block coding (SFBC) is a coding technique for transmit diversity. In SFBC, blocks of data transmitted using a plurality of transmit antennas are separated in space (arising from the separation between transmit antennas of the plurality of transmit antennas) and frequency (due to the separation in frequency between subcarriers used to convey the blocks of data). SFBC operation is performed on sets of complex valued modulation symbols, and the sets of complex valued modulation symbols are mapped onto resources of the transmit antennas in various combinations of modulation symbol ordering, modulation symbol sign, and complex conjugation.

In the Third Generation Partnership Project (3GPP) Long Term Evolution (LTE) technical standards Release 14 (3GPP LTE Rel-14), semi-open-loop transmission based on the demodulation reference signal (DMRS) is defined. While in the semi-open-loop transmission mode, UEs report codebook W1 that targets wideband and/or long term channel properties, a channel state information reference signal (CSI-RS) indicator (CRI), and a rank indication (RI). For Rank 1 transmissions, SFBC is used, while precoder cycling is used for Rank 2 transmissions.

Figure 2:
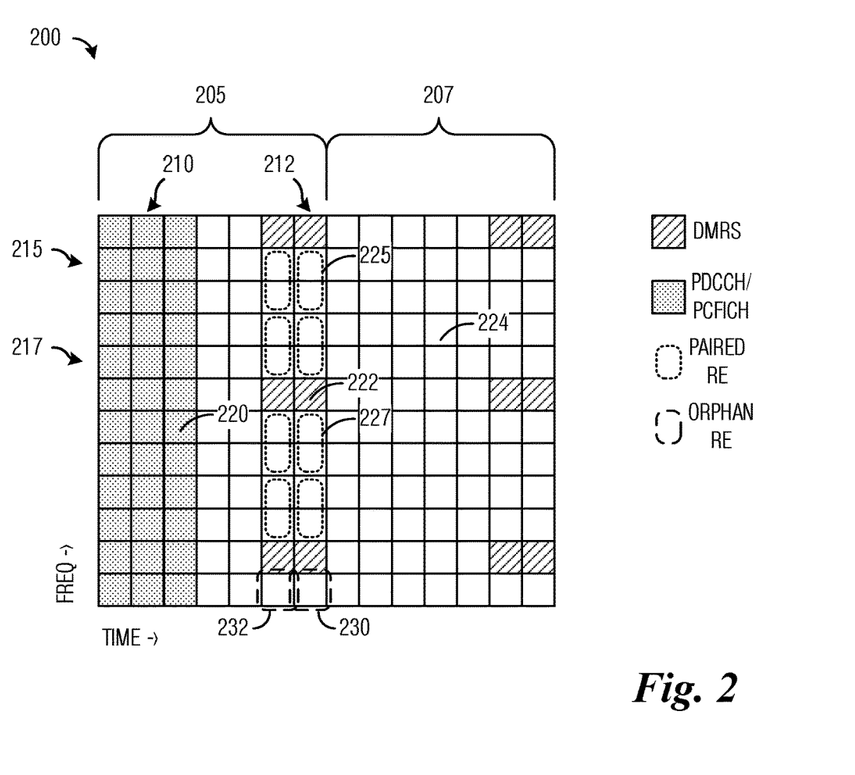
FIG. 2 illustrates an example 3GPP LTE subframe.

In LTE system, the largest unit of time is the toms radio frame, which is divided into ten 1 ms subframes. Each subframe is further divided into two 0.5 ms slots. Each slot comprises 7 orthogonal frequency division multiplexed (OFDM) symbols in case of the normal Cyclic Prefix (CP) length or 6 OFDM symbols for extended CP. In the frequency domain, 12 subcarriers are grouped together for duration of one slot, which is termed a Physical Resource Block (PRB). FIG. 2 illustrates an example 3GPP LTE PRBs 200 within a subframe in normal CP case. LTE PRBs 200 includes two PRBs 205 and 207. Each PRB comprises 12 subcarriers, such as subcarriers 215 and 217, from each of seven OFDM symbols, such as OFDM symbols 210 and 212. A single subcarrier component of an OFDM symbol is referred to as a resource element (RE), such as REs 220, 222, and 224. A RE is the smallest unit of resource assignment. Different REs can be dedicated to carry different types of information. As an illustrative example, shaded REs (such as RE 220) are used to carry either physical downlink control channel (PDCCH) data or physical control format indicator channel (PCFICH) data, while cross-hatched REs (such as RE 222) are used to carry DMRS and unshaded REs (such as RE 224) are available to carry data (depending on configuration). The actual assignment of data type to RE may be dependent upon the communications mode being used, the number of antenna ports, and so on.

An even number of REs in the frequency domain are required for SFBC transmission. As an example, SFBC transmission with two transmit antenna ports will require two REs in the frequency domain, while four transmit antenna ports will require four REs in the frequency domain.

The even number of REs can be grouped together into groups of two, which are referred to as paired REs, such as paired REs 225 and 227.

However, in some OFDM symbols, such as OFDM symbol 212, some REs are already dedicated for other data types (such as RE 222 being dedicated for DMRS data), and are not available for data transmission. If there is an odd number of REs in the OFDM symbol remaining for data transmission, then at least one of the REs will not be usable for SFBC transmission. The REs unusable for SFBC transmission are referred to as orphan REs, such as orphan REs 230 and 232.

A technique proposed to deal with orphan REs in OFDM symbols involves the transmission of orphan REs across an even number (e.g., two) neighboring OFDM symbols using space time block coding (STBC). As an illustrative example, orphan REs 230 and 232 are transmitted using STBC to eliminate the two orphan REs. However, this technique, which involves REs spanning neighboring OFDM symbols, will break the UE demodulation pipeline, as well as complicate UE implementation.

Although the discussion presented herein uses 3GPP LTE terminology and presents examples and configurations from the 3GPP LTE technical standards, the example embodiments are operable with other communications systems that support communications using OFDM symbols with a smallest unit of resource assignment that is smaller than an OFDM symbol, and SFBC transmission. Therefore, the use of 3GPP LTE terminology and examples should not be construed as being limiting to either the scope or the spirit of the example embodiments.

According to an example embodiment, a precoder is used to transmit orphan REs of OFDM symbols. The paired REs of the OFDM symbols are transmitted using SFBC, while the orphan REs are transmitted using a precoder. The precoder used in the transmission is indicated by codebook subset restriction. As an illustrative example, with one OFDM symbol, the SFBC transmission used for paired REs is expressible as $$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} Re(x^{(0)}(i)) \\ Re(x^{(1)}(i)) \\ Im(x^{(0)}(i)) \\ Im(x^{(1)}(i)) \end{bmatrix},$$

where $y^{(o)}$ and $y^{(1)}$ are the transmitted signals on subcarriers $2i$ and $2i+1$ for antenna ports o and 1, $x^{(o)}(i)$ and $x^{(1)}(i)$ are the i-th data symbol paired before space-frequency block coding, Re(.) is the real component of (.), Im(.) is the imaginary component of (.), and j is the imaginary number. While the precoded transmission of an orphan RE is expressible as $$\begin{bmatrix} y^{(0)}(i) \\ y^{(1)}(i) \end{bmatrix} = vx(i),$$

where $y^{(o)}$ and $y^{(1)}$ are the transmitted signals on orphan RE subcarrier for antenna ports o and 1 respectively, x(i) is data symbol in the i-th orphan RE, and v is the precoder.

According to an example embodiment, the precoder used in the transmission of the orphan REs is indicated to the transmitting device and the receiving device. In general, both the transmitting device and the receiving device have to have knowledge of the precoder to use in the transmission and the reception of the orphan REs.

In an example embodiment, the precoder used in the transmission and the reception of the orphan REs is indicated by radio resource control (RRC) signaling. As an illustrative example, a transmitting device indicates to a receiving device the precoder used in the transmission of the orphan REs by sending a RRC message to the receiving device. An example of such a RRC message is a CodebookSubsetRestriction message. The CodebookSubsetRestriction message may be transmitted by itself to the receiving device or it may be piggy-backed with other RRC messages. Alternatively, a network entity (such as a communications controller or a device dedicated to the selection of the precoder) selects the precoder used and indicates the selected precoder to both the transmitting and receiving devices. Furthermore, in a situation where a dual-polarization codebook is used, the precoder may be indicated using a co-phasing parameter in a 3GPP LTE codebook W2 CSI report. In other words, the precoder is selected from a set that comprises {[1 1], [1 j], [1 −1], [1 −j]} and used for orphan RE transmission and reception.

In another example embodiment, a group of precoders are pre-defined and a precoder used in the transmission and reception of orphan REs is alternatively selected from the group of precoders. The selection of the precoder may be based on a specified rule. As an illustrative example, the precoder selected may be based on a number of the orphan RE, a number of the OFDM symbol containing the orphan RE, a next precoder in the group of precoders, and so on. The transmitting device and the receiving device may have knowledge of the specified rule used to select the precoder. Alternatively, the transmitting device may indicate to the receiving device the specified rule to use, or the precoder to use. The group of precoders may be defined by a technical standard or an operator of the communications system. Alternatively, the transmitting and receiving devices collaborate to define the group of precoders.

In another example embodiment, in the frequency dimension, multiple contiguous PRBs are bundled together for data transmission. REs in bundled PRBs may be paired together for SFBC transmission if in one OFDM symbol, a first RE is at the lowest subcarrier of a first neighboring PRB and a second RE is at the highest subcarrier of a second neighboring PRB, and vice versa. It is noted that the first neighboring PRB and the second neighboring PRB are scheduled for transmission at substantially the same time to one UE. However, even in a deployment supporting the bundling of contiguous PRBs, there may still be REs that cannot be paired for SFBC transmission. Such REs are orphan REs, and may be transmitted with a precoder using techniques such as those described herein.

Figure 3A:
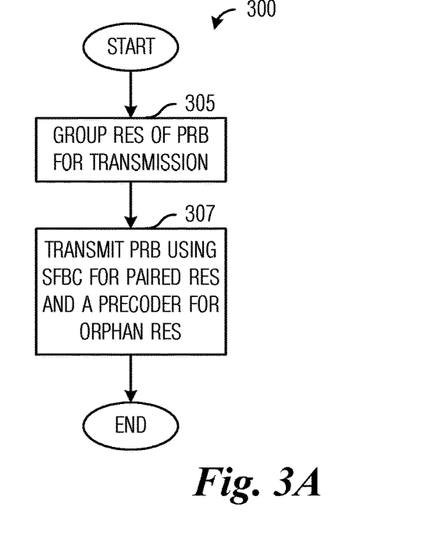
FIG. 3A illustrates a flow diagram of example operations occurring in a transmitting device that is transmitting a PRB according to example embodiments described herein.

FIG. 3A illustrates a flow diagram of example operations 300 occurring in a transmitting device that is transmitting a PRB. Operations 300 may be indicative of operations occurring in a transmitting device, such as an access node in a downlink transmission or a UE in an uplink transmission, as the transmitting device transmits a PRB.

Operations 300 begin with the transmitting device grouping REs of a PRB for transmission (block 305). Grouping the REs of the PRB for transmission may include pairing REs for transmission, as well as identifying orphan REs. As an example, REs in adjacent subcarriers of an OFDM symbol are paired. However, depending on the number of REs available for data transmission in any particular OFDM symbol, one or more REs that cannot be paired may be orphan REs. The transmitting device transmits the PRB (block 307). The transmission of the PRB comprises using SFBC for paired REs while orphan REs are transmitted using a precoder.

Figure 3B:
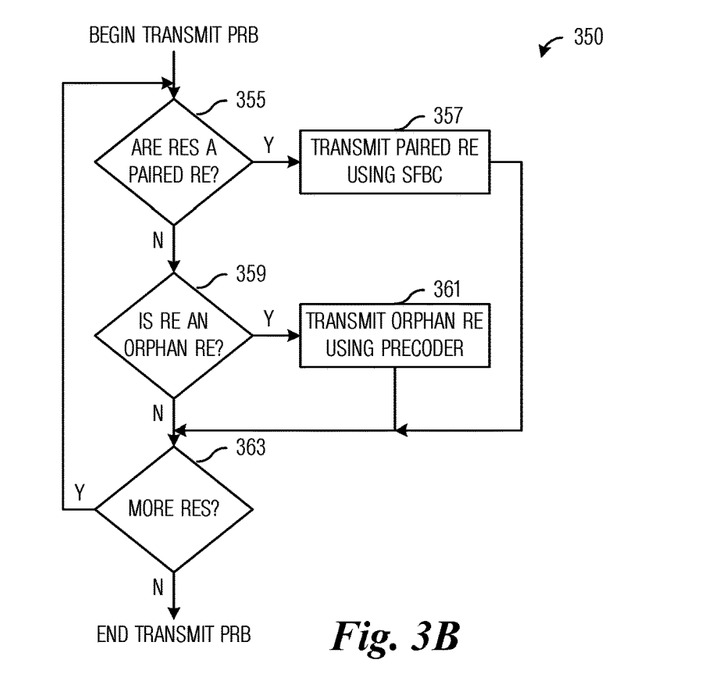
FIG. 3B illustrates a flow diagram of example operations occurring in a transmitting device that is transmitting a PRB with an orphan RE according to example embodiments described herein.

FIG. 3B illustrates a flow diagram of example operations 350 occurring in a transmitting device that is transmitting a PRB with an orphan RE. Operations 350 may be indicative of operations occurring in a transmitting device as the transmitting device transmits a PRB with an orphan RE.

Operations 350 begin with the transmitting device performing a check to determine if RE to be transmitted is part of a paired RE (block 355). If the RE is part of a paired RE, the transmitting device transmits the paired RE using SFBC (block 357). If the RE is not part of a paired RE, the transmitting device performs a check to determine if the RE is an orphan RE (block 359). If the RE is an orphan RE, the transmitting device transmits the orphan RE using a precoder (block 361). Transmitting the orphan RE using the precoder may involve applying the precoder to the orphan RE to produce transmission symbols and then transmitting the transmission symbols. If the RE is not an orphan RE (or after transmitting the paired RE using SFBC or the orphan RE using the precoder), the transmitting device performs a check to determine if there are more REs in the PRB to transmit (block 363). If there are more REs to transmit, the transmitting device returns to block 355 to transmit additional REs. If there are no more REs, operations 350 ends.

Figure 4:
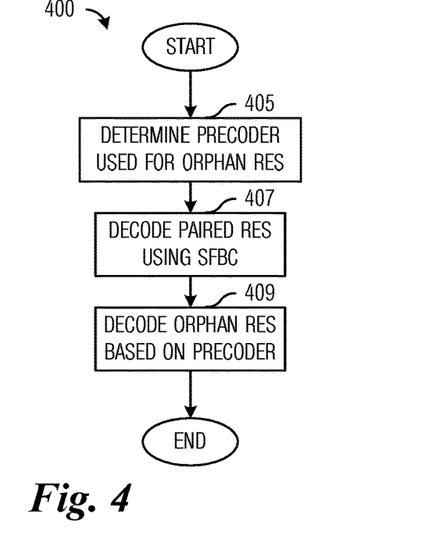
FIG. 4 illustrates a flow diagram of example operations occurring in a receiving device that is receiving a PRB according to example embodiments described herein.

FIG. 4 illustrates a flow diagram of example operations 400 occurring in a receiving device that is receiving a PRB. Operations 400 may be indicative of operations occurring in a receiving device, such as a UE in a downlink transmission or an access node in an uplink transmission, as the receiving device receives a PRB.

Operations 400 begin with the receiving device determining a precoder used for orphan REs (block 405). The receiving device may be able to determine the precoder used for orphan REs by processing a message (e.g., a RRC message) that includes an indicator of the precoder used in the transmission of orphan REs. Alternatively, the receiving device may be able to determine the precoder used for orphan REs by applying a specified rule to a group of precoders available to the transmitting device to precode the orphan RE prior to transmission. The specified rule may be defined by a technical standard or an operator of the communications system. Alternatively, the transmitting and receiving devices collaborate to define the specified rule. As yet another alternative, the receiving device may receive an indication of which specified rule to use. Similarly, the group of precoders may be defined by a technical standard or an operator of the communications system. Alternatively, the transmitting and receiving devices collaborate to define the group of precoders. The receiving device receives REs and decodes paired REs using SFBC (block 407), while orphan REs are decoded based on the precoder used in the transmission of the orphan RE (block 409).

Figure 5:
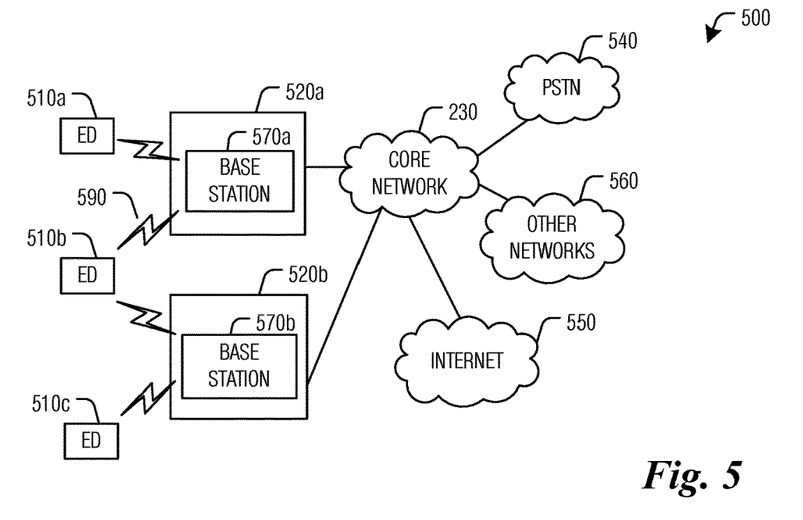
FIG. 5 illustrates an example communication system according to example embodiments described herein.

FIG. 5 illustrates an example communication system 500. In general, the system 500 enables multiple wireless or wired users to transmit and receive data and other content. The system 500 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 500 includes electronic devices (ED) 510a-510c, radio access networks (RANs) 520a-520b, a core network 530, a public switched telephone network (PSTN) 540, the Internet 550, and other networks 560. While certain numbers of these components or elements are shown in FIG. 5, any number of these components or elements may be included in the system 500.

The EDs 510a-510c are configured to operate and/or communicate in the system 500. For example, the EDs 510a-510c are configured to transmit and/or receive via wireless or wired communication channels. Each ED 510a-510c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 520a-520b here include base stations 570a-570b, respectively. Each base station 570a-570b is configured to wirelessly interface with one or more of the EDs 510a-510c to enable access to the core network 530, the PSTN 540, the Internet 550, and/or the other networks 560. For example, the base stations 570a-570b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 510a-510c are configured to interface and communicate with the Internet 550 and may access the core network 530, the PSTN 540, and/or the other networks 560.

In the embodiment shown in FIG. 5, the base station 570a forms part of the RAN 520a, which may include other base stations, elements, and/or devices. Also, the base station 570b forms part of the RAN 520b, which may include other base stations, elements, and/or devices. Each base station 570a-570b operates to transmit and/or receive wireless signals within a particular geographic region or area, sometimes referred to as a "cell." In some embodiments, multiple-input multiple-output (MIMO) technology may be employed having multiple transceivers for each cell.

The base stations 570a-570b communicate with one or more of the EDs 510a-510c over one or more air interfaces 590 using wireless communication links. The air interfaces 590 may utilize any suitable radio access technology.

It is contemplated that the system 500 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 520a-520b are in communication with the core network 530 to provide the EDs 510a-510c with voice, data, application, Voice over Internet Protocol (VoIP), or other services. Understandably, the RANs 520a-520b and/or the core network 530 may be in direct or indirect communication with one or more other RANs (not shown). The core network 530 may also serve as a gateway access for other networks (such as the PSTN 540, the Internet 550, and the other networks 560). In addition, some or all of the EDs 510a-510c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 550.

Although FIG. 5 illustrates one example of a communication system, various changes may be made to FIG. 5. For example, the communication system 500 could include any number of EDs, base stations, networks, or other components in any suitable configuration.

Figure 6A:
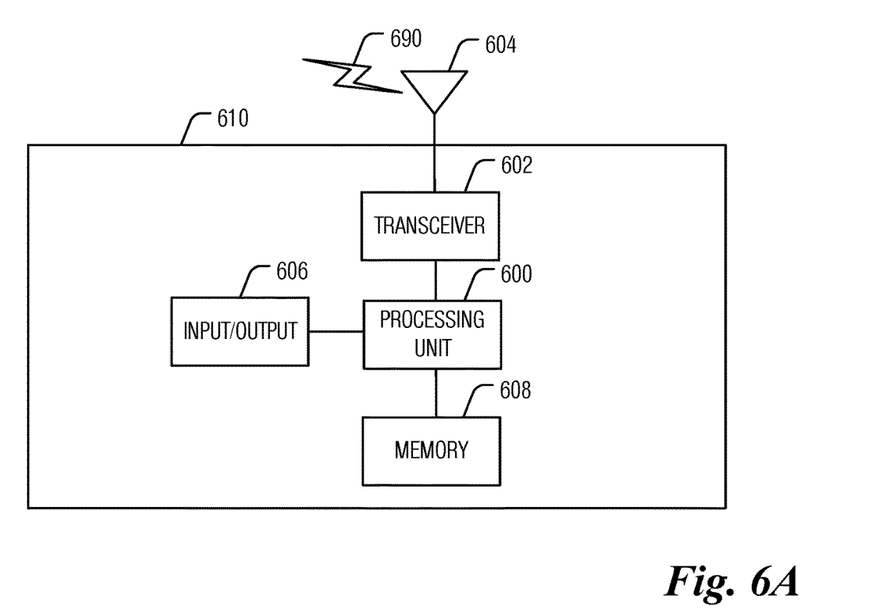
FIGS. 6A and 6B illustrate example devices that may implement the methods and teachings according to this disclosure.
Figure 6B:
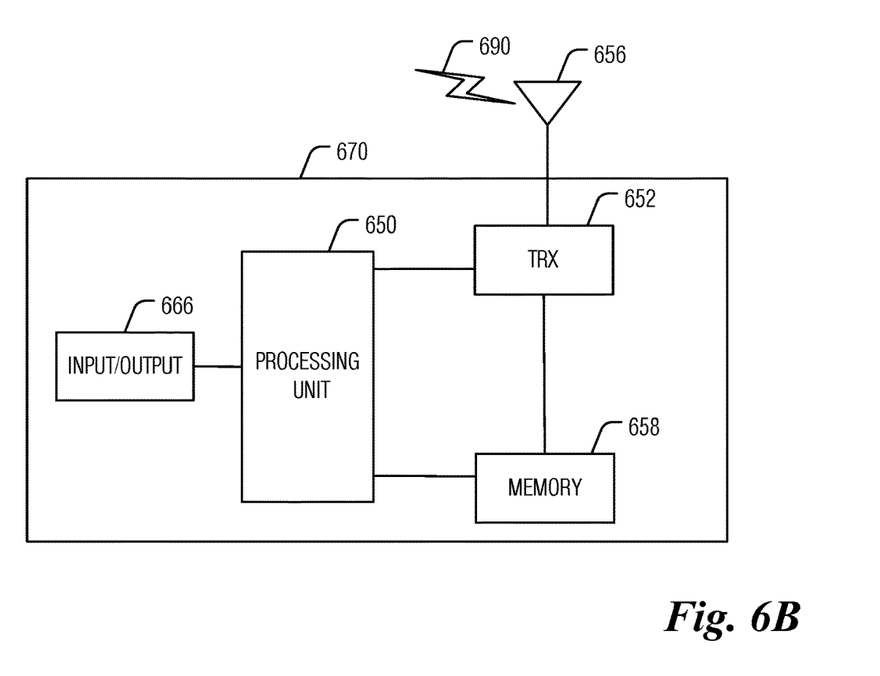

FIGS. 6A and 6B illustrate example devices that may implement the methods and teachings according to this disclosure. In particular, FIG. 6A illustrates an example ED 610, and FIG. 6B illustrates an example base station 670. These components could be used in the system 500 or in any other suitable system.

As shown in FIG. 6A, the ED 610 includes at least one processing unit 600. The processing unit 600 implements various processing operations of the ED 610. For example, the processing unit 600 could perform signal coding, data processing, power control, input/output processing, or any other functionality enabling the ED 610 to operate in the system 500. The processing unit 600 also supports the methods and teachings described in more detail above. Each processing unit 600 includes any suitable processing or computing device configured to perform one or more operations. Each processing unit 600 could, for example, include a microprocessor, microcontroller, digital signal processor, field programmable gate array, or application specific integrated circuit.

The ED 610 also includes at least one transceiver 602. The transceiver 602 is configured to modulate data or other content for transmission by at least one antenna or NIC (Network Interface Controller) 604. The transceiver 602 is also configured to demodulate data or other content received by the at least one antenna 604. Each transceiver 602 includes any suitable structure for generating signals for wireless or wired transmission and/or processing signals received wirelessly or by wire. Each antenna 604 includes any suitable structure for transmitting and/or receiving wireless or wired signals. One or multiple transceivers 602 could be used in the ED 610, and one or multiple antennas 604 could be used in the ED 610. Although shown as a single functional unit, a transceiver 602 could also be implemented using at least one transmitter and at least one separate receiver.

The ED 610 further includes one or more input/output devices 606 or interfaces (such as a wired interface to the Internet 550). The input/output devices 606 facilitate interaction with a user or other devices (network communications) in the network. Each input/output device 606 includes any suitable structure for providing information to or receiving/providing information from a user, such as a speaker, microphone, keypad, keyboard, display, or touch screen, including network interface communications.

In addition, the ED 610 includes at least one memory 608. The memory 608 stores instructions and data used, generated, or collected by the ED 610. For example, the memory 608 could store software or firmware instructions executed by the processing unit(s) 600 and data used to reduce or eliminate interference in incoming signals. Each memory 608 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 6B, the base station 670 includes at least one processing unit 650, at least one transceiver 652, which includes functionality for a transmitter and a receiver, one or more antennas 656, at least one memory 658, and one or more input/output devices or interfaces 666. A scheduler, which would be understood by one skilled in the art, is coupled to the processing unit 650. The scheduler could be included within or operated separately from the base station 670. The processing unit 650 implements various processing operations of the base station 670, such as signal coding, data processing, power control, input/output processing, or any other functionality. The processing unit 650 can also support the methods and teachings described in more detail above. Each processing unit 650 includes any suitable processing or computing device configured to perform one or more operations. Each processing unit 1350 could, for example, include a microprocessor, microcontroller, digital signal processor, field programmable gate array, or application specific integrated circuit.

Each transceiver 652 includes any suitable structure for generating signals for wireless or wired transmission to one or more EDs or other devices. Each transceiver 652 further includes any suitable structure for processing signals received wirelessly or by wire from one or more EDs or other devices. Although shown combined as a transceiver 652, a transmitter and a receiver could be separate components. Each antenna 656 includes any suitable structure for transmitting and/or receiving wireless or wired signals. While a common antenna 656 is shown here as being coupled to the transceiver 652, one or more antennas 656 could be coupled to the transceiver(s) 652, allowing separate antennas 656 to be coupled to the transmitter and the receiver if equipped as separate components. Each memory 658 includes any suitable volatile and/or non-volatile storage and retrieval device(s). Each input/output device 666 facilitates interaction with a user or other devices (network communications) in the network. Each input/output device 666 includes any suitable structure for providing information to or receiving/providing information from a user, including network interface communications.

Figure 7:
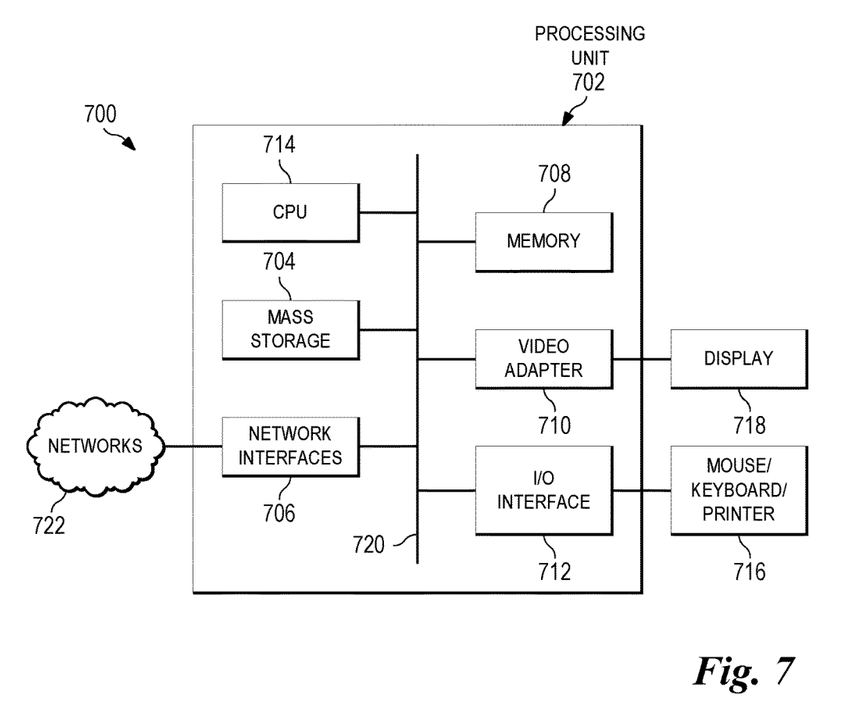
FIG. 7 is a block diagram of a computing system that may be used for implementing the devices and methods disclosed herein.

FIG. 7 is a block diagram of a computing system 700 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 700 includes a processing unit 702. The processing unit includes a central processing unit (CPU) 714, memory 708, and may further include a mass storage device 704, a video adapter 710, and an I/O interface 712 connected to a bus 720.

The bus 720 may be one or more of any type of several bus architectures including a memory bus or memory controller, a peripheral bus, or a video bus. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, or an optical disk drive.

The video adapter 710 and the I/O interface 712 provide interfaces to couple external input and output devices to the processing unit 702. As illustrated, examples of input and output devices include a display 718 coupled to the video adapter 710 and a mouse/keyboard/printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device.

The processing unit 702 also includes one or more network interfaces 706, which may comprise wired links, such as an Ethernet cable, and/or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a grouping unit/module, an applying unit/module, a selecting unit/module, a sending unit/module, a determining unit/module, and/or a decoding unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for transmitting data, the method comprises:
grouping, by a transmitting device, resource elements (REs) of orthogonal frequency division multiplexed (OFDM) symbols of a physical resource block (PRB) into at least one paired RE and at least one orphan RE;
transmitting, by the transmitting device, the at least one paired RE in accordance with space frequency block coding (SFBC); and
transmitting, by the transmitting device, the at least one orphan RE in accordance with a precoder, the SFBC and the precoder providing different coding of the at least one paired RE and the at least one orphan RE, respectively.

2. The method of claim 1, wherein transmitting the at least one orphan RE comprises:
applying, by the transmitting device, the precoder to the at least one orphan RE to produce transmission symbols; and
transmitting, by the transmitting device, the transmission symbols.

3. The method of claim 1, wherein the transmitting device is operating in a semi-open-loop transmission mode.

4. The method of claim 1, further comprising:
selecting, by the transmitting device, the precoder.

5. The method of claim 4, further comprising:
sending, by the transmitting device, an indication of the precoder to a receiving device.

6. The method of claim 5, wherein the indication is sent in a radio resource control (RRC) message.

7. The method of claim 6, wherein the indication is a co-phasing parameter of a Third Generation Partnership Project (3GPP) Long Term Evolution (LTE) codebook W2 channel state information (CSI) report.

8. The method of claim 4, wherein the precoder is selected from a group of precoders in accordance with a specified rule.

9. The method of claim 8, wherein the group of precoders is predefined or signaled by the transmitting device.

10. The method of claim 8, wherein the specified rule is specified by one of a technical standard or an operator of a communications system including the transmitting device.

11. A method for receiving data, the method comprising:
determining, by a receiving device, a precoder used in a transmission of at least one orphan resource element (RE);
decoding, by the receiving device, at least one paired RE in accordance with space frequency block coding (SFBC); and
decoding, by the receiving device, the at least one orphan RE in accordance with the precoder.

12. The method of claim 11, wherein determining the precoder comprises:
receiving an indication of the precoder.

13. The method of claim 12, wherein the indication is received in a radio resource control (RRC) message.

14. The method of claim 11, wherein determining the precoder comprises:
receiving, by the receiving device, indication of a group of precoders, and
selecting, by the receiving device, the precoder from the group of precoders in accordance with a specified rule.

15. The method of claim 14, wherein the specified rule is received in a message.

16. The method of claim 14, wherein the specified rule is specified by one of a technical standard or an operator of a communications system including the receiving device.

17. A transmitting device comprising:
a non-transitory memory storage comprising instructions; and
one or more processors in communication with the non-transitory memory storage wherein the one or more processors execute the instructions to:
group resource elements (REs) of orthogonal frequency division multiplexed (OFDM) symbols of a physical resource block (PRB) into at least one paired RE and at least one orphan RE,
transmit the at least one paired RE in accordance with space frequency block coding (SFBC), and
transmit the at least one orphan RE in accordance with a precoder, wherein the SFBC and the precoder provide different coding of the at least one paired RE and the at least one orphan RE, respectively.

18. The transmitting device of claim 17, wherein the one or more processors execute the instructions to apply the precoder to the at least one orphan RE to produce transmission symbols, and transmit the transmission symbols.

19. The transmitting device of claim 17, wherein the one or more processors execute the instructions to select the precoder.

20. The transmitting device of claim 19, wherein the one or more processors execute the instructions to send an indication of the precoder to a receiving device.

21. A receiving device comprising:
  a non-transitory memory storage comprising instructions; and
  one or more processors in communication with the non-transitory memory storage, wherein the one or more processors execute the instructions to:
    determine a precoder used in a transmission of at least one orphan resource element (RE),
    decode at least one paired RE in accordance with space frequency block coding (SFBC), and
    decode the at least one orphan RE in accordance with the precoder.

22. The receiving device of claim 21, wherein the one or more processors execute the instructions to receiving an indication of the precoder.

23. The receiving device of claim 22, wherein the indication is received in a radio resource control (RRC) message.

24. The receiving device of claim 21, wherein the one or more processors execute the instructions to select the precoder from a group of precoders in accordance with a specified rule.

25. The receiving device of claim 24, wherein the specified rule is received in a message.

* * * * *